United States Patent
Dammrose et al.

(10) Patent No.: US 6,922,468 B1
(45) Date of Patent: Jul. 26, 2005

(54) SYSTEM AND METHOD OF USING LOCAL NUMBER PORTABILITY (LNP) TO REDIRECT TERMINATING CALLS TO A SERVICE NODE

(75) Inventors: John Mark Dammrose, Woodinville, WA (US); Joseph P. Marx, Kirkland, WA (US); Elaine I. Sze, Kirkland, WA (US)

(73) Assignee: Cingular Wireless II, LLC, Atlanta, GA (US)

( * ) Notice: Subject to any disclaimer, the term of this patent is extended or adjusted under 35 U.S.C. 154(b) by 678 days.

(21) Appl. No.: 09/589,241

(22) Filed: Jun. 7, 2000

(51) Int. Cl.$^7$ ............................. H04M 3/42; H04M 7/00
(52) U.S. Cl. ........................... 379/221.13; 379/207.02; 379/221.03; 379/221.09
(58) Field of Search .................. 379/221.13, 221.03, 379/207.02, 221.09

(56) References Cited

U.S. PATENT DOCUMENTS

| | | | |
|---|---|---|---|
| 5,353,331 A | 10/1994 | Emery et al. | 379/58 |
| 5,850,391 A | 12/1998 | Essigmann | 370/331 |
| 5,884,179 A | 3/1999 | Patel | 455/445 |
| 5,915,009 A | 6/1999 | Williams et al. | 379/207 |
| 5,940,492 A | 8/1999 | Galloway et al. | 379/230 |
| 6,438,223 B1 * | 8/2002 | Eskafi et al. | 379/221.13 |
| 6,526,137 B1 * | 2/2003 | Copley | 379/221.03 |
| 6,570,973 B1 * | 5/2003 | Boughman et al. | 379/207.02 |

FOREIGN PATENT DOCUMENTS

| WO | WO98/05174 | 2/1998 | H04Q/7/22 |
|---|---|---|---|

* cited by examiner

*Primary Examiner*—Ahmad F. Matar
*Assistant Examiner*—Thjuan P Knowlin

(57) ABSTRACT

A system and method are provided for using Local Number Portability (LNP) and the public switched telephone network (PSTN) trunks as virtual loop-around trunks. Present invention LNP structures and processes redirect calls to avoid the creation of loop-around trunks from calls generated in the local exchange carrier (LEC) requiring services such as prepaid caller and calling party pays. A virtual trunk switch is created using a Switch Control Point (SCP). Telephone numbers requiring special services are ported and stored in a LNP database. Numbers requiring special services are flagged with a LRN that identifies a special service switch which is either an SSP or an SCP. The LRN initiates communication between the local exchange switch and the special service switch. Once engaged, the special service switch protocols create the trunk links. By monitoring these trunk links, the special service switch is able to monitor the in-band communications, and so provide the special services. Similar processes are provided using the LNP to insert either a Service Switching Point (SSP) or an Intelligent Peripheral (IP) in the network trunk to provide services with a fewer number of switch connections.

25 Claims, 6 Drawing Sheets

SYSTEM AND METHOD OF USING LOCAL NUMBER PORTABILITY (LNP) TO REDIRECT TERMINATING CALLS TO A SERVICE NODE

BACKGROUND OF THE INVENTION

This invention relates generally to communication networks and, more particularly, to a system and method of using Local Number Portability (LNP) features to redirect terminating calls to a service node, such as a Service Control Point (SCP), so that the network services to communication devices can be initiated, monitored, and billed.

In an ISDN User Part (ISUP) quasi-associated signaling system, where ISDN stands for Integrated Services Digital Network, a landline telephone is typically serviced through a switch, or a Service Switching Point (SSP). Both the telephone and the SSP have fixed locations inside a district with an area code. Each SSP is associated with an exchange number, and the SSP maintains a database of the telephones it services. In a ten digit telephone number ($x_1x_2x_3$-$x_4x_5x_6$-$x_7x_8x_9x_{10}$), the area code is the first set of three digits ($x_1x_2x_3$), the exchange number is the second set of three digits ($x_4x_5x_6$), and the subscriber number is the last set of four digits ($x_7x_8x_9x_{10}$). The local number of a subscriber is the exchange and subscriber numbers ($x_4$–$x_{10}$).

Telephone users are familiar with the inconvenience of acquiring a new telephone number after a change of residence. However, it is very important to most businesses that they retain their old local telephone numbers when changing business addresses or locations. Further, to encourage competition between telephone service providers, non-business users must be permitted to change service providers without losing their preexisting local telephone numbers. To this end, Local Number Portability (LNP) procedures have been developed.

FIG. 1 is a schematic block diagram illustrating the concept of LNP in a communications network 10 (prior art). LNP permits a local telephone number to be moved from a first (original) exchange to a second (new) exchange, or moved from a first switch (SSP) to a second switch (SSP). That is, LNP processes permit the telephone number to become associated with the new exchange, despite the fact that the telephone number is from the old exchange. Telephone 12 is shown as formerly associated with switch 14, but presently associated with switch 16. The previous association with switch 14 is indicated with dotted line 18. Originating telephone 20 originates a telephone call to terminating telephone 12. Local exchange (N-1) switch 22 maintains a record that at least one number associated with switch 14 is a ported local telephone number, or a number that has moved to a new exchange. Therefore, all numbers in that exchange (associated with switch 14) must be checked for LNP. Out-of-band communications are established between switch 22, through Signal Transfer Point (STP) 24 to a LNP database 26. LNP database 26 maintains a record of ported numbers. A Local Routing Number (LRN) is returned to switch 22 which permits switch 22 and switch 16 to establish a trunk connection for voice communications between telephones 20 and 12.

FIG. 2 is a schematic block diagram of a prior art communication network 10 where special services are being provided. Specifically, FIG. 2 depicts the rerouting of voice communications and Signaling System 7 (SS7) signals. Initially, a call from originating telephone 40 is attempting to terminate to a mobile subscriber terminating telephone 42. The call arrives at the last switch outside of a mobile subscriber's home switch, (N-1) switch 44, without a check having been performed to determine if the number has been ported to another exchange or carrier. In the second step, of checking the LNP database 46, the Mobile Directory Number (MDN) is determined not to need redirection (i.e., the number has not been ported).

In step 3 the call is delivered to the home MSC 48. In step 4 the call is delivered to a service node 50 for special feature handling. Examples of special features include prepaid service platforms, where a customer has a prepaid account that is debited as the call progresses, and call attendant services which require caller input, such as automated recordings that redirect calls for services in response to voice or dialing prompts from the telephone user.

In step 5 the call is returned to the MSC 48 for routing to the final destination, terminating telephone 42. In step 6 the call is completed, delivered to the terminating telephone 42 or routed to another destination. As depicted, switch 48 is a Mobile Switching Center (MSC) and terminating telephone 42 is a wireless telephone. However, the same principles apply when switch 48 is a Class-5 landline switch (SSP) and terminating wireless telephone 42 is a landline telephone. Generally, MSC and Class-5 switches are referred to herein as a terminating switch to cover both wireless and landline applications.

FIG. 3 is a schematic block diagram of a prior art communication network 10 requiring a loop-around circuit for voice communications. Initially, a call is attempting to terminate with mobile subscriber terminating telephone 42. The call arrives at the last switch outside the MSC 48, namely (N-1) switch 44, without a check having been performed to determine if the terminating telephone 42 has a telephone number that has been ported to another carrier, or if the number is associated with a new exchange. In step 2 the MDN is determined not to need redirection after a check with LNP database 46. That is, the number has not been ported and has not been converted to an LRN.

In step 3 the call is delivered to MSC 48. In step 4 the call is forwarded using ISUP trunks to an SCP 52 for special feature handling. The SCP 52 is now a network element controlling the call using ISUP signaling. Node 52 can perform special handling using ISUP. For example, a call can be recalled to the SCP 52 for diversion to another destination or call release. Examples of these procedures include prepaid services and call attendant redirection services, including time-of-day redirection schedules. The physical voice path is a loop-around circuit 54 on the MSC 48. Only the ISUP (out-of-band) signaling is routed to SCP 52. Switch 52 must be inserted to monitor the out-of-band control signal communications. For example, the length of the call must be monitored and compared to the prepaid account. Therefore, the control signals indicating the start and finish of the voice communication are monitored. The SCP 52 checks the out-of-band messages to determine whether terminating telephone 42 is allowed to receive this call (i.e., has enough money). All progress messages, such as Setup and Teardown messages, associated with this call are communicated through SCP 52.

In step 5 the call is forwarded to the MSC 48 for routing to the final destination. From the perspective of the MSC 48, the incoming initial address message (IAM) appears to be a new incoming call requiring call completion. The called number of the IAM originating from the SCP 52 may or may not be modified depending on the feature requirements. In step 6 the call is completed, delivered to terminating telephone 42, or routed to another destination.

Using the procedures described in FIGS. 2 and 3, a dedicated telephone number range can be used to alert a switch of a subscriber requiring special services—for example, a dedicated 10,000 number block, such as all the telephone numbers in the range between 206-419-0000 and 206-419-9999 can be set aside. Such a 10K number block can be used to alert the system switches that a telephone number requires prepaid subscriber services. However, such a service would require the subscriber to change telephone numbers to receive such special services. Therefore, using 10K number blocks to provide notification to the system of subscribers requiring special services creates a corresponding inconvenience to the subscribers. In fact, many subscribers are unwilling to change telephone numbers in exchange for a telephone number with enhanced capacities. Further, the use of loop-arounds in the system to monitor the special services requires additional system resources and additional system process steps.

It would be advantageous if so-called "t1" circuit cards, specifically dedicated to provide special services which engage loop-around features in a system switch, could be eliminated. Further, it would be advantageous if specially dedicated t1 circuit cards could be replaced with conventional t1 circuit cards to expand the ability of the system to process conventional telephone calls.

It would be advantageous if a telephone subscriber could receive additional services from the network without having to change their telephone number.

It would be advantageous if an LNP database could be used to identify customers who are receiving special services from the network.

It would be advantageous if the LRN, provided from a LNP database, could be used to route calls to special service nodes when calls are made to customers receiving these special services.

SUMMARY OF THE INVENTION

Accordingly, the present invention provides a method for establishing trunk routes, or out-of-band signals through a virtual switch in a quasi-associated signaling system network. The method begins with a request to complete a call to a terminating telephone with a first telephone number. Then, it is determined if the number is ported. If ported, an LNP database is searched for LRN instructions associated with the first number. The LRN instructions direct the signaling to a service node. Depending upon the node type, the service node is inserted into either the voice or out-of-band signal path to monitor communications to the first telephone number. The service node replaces the loop-around process in some applications.

Specifically, a Service Control Point (SCP), or some other services platform, is provided to act as the virtual switch to monitor out-of-band communications. A special class of ported telephone numbers are used to access LRNs which route out-of-band communications from a switch point to the virtual node SCP. The SCP, once engaged, establishes a switching protocol whereby the trunking path is completed. Then, the SCP can monitor the associated out-of-band communications in the trunk path. The out-of-band messaging provides information about the calling party, the called party, the start of the call, and the end of the call. In response to the monitoring, special services are provided to the telephone receiving the call. The monitoring can also result in a billing step that is responsive to monitoring the out-of-band communications of the receiving telephone.

Alternately, the service node can be an SSP or Intelligent Peripheral (IP) which can be inserted into the voice communications path to the device with the first telephone number. Then, special voice-related services can be monitored without the necessity of additional switches in the call path.

A system for establishing signal paths for special services in a communications network is also provided. The system includes a terminating telephone to receive a call and a service node connected in the signal path to the terminating telephone. An LNP database with a list of LRNs cross-referenced with ported telephone numbers supplies LRN instructions to the service node. The service node provides network services to the terminating telephone in response to being connected in the signal path to the terminating telephone.

As above, the service node is either an SCP connected in the out-of-band signal path to the terminating telephone, or an SSP or IP connected in the voice communications signal path to the terminating telephone.

DETAILED DESCRIPTION OF THE PREFERRED EMBODIMENT

Figure 1:
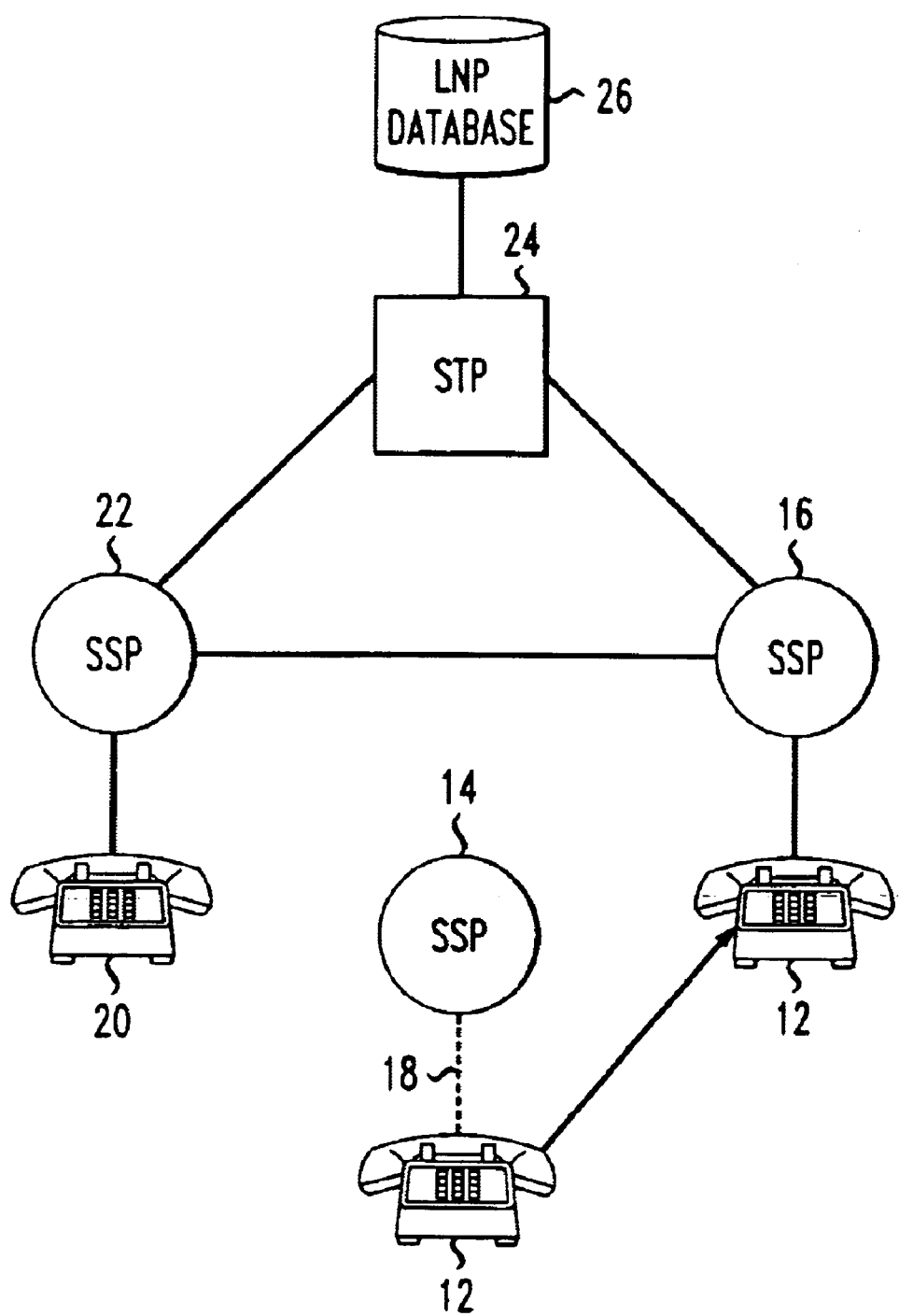
FIG. 1 is a schematic block diagram illustrating the concept of LNP in a communications network (prior art).
Figure 2:
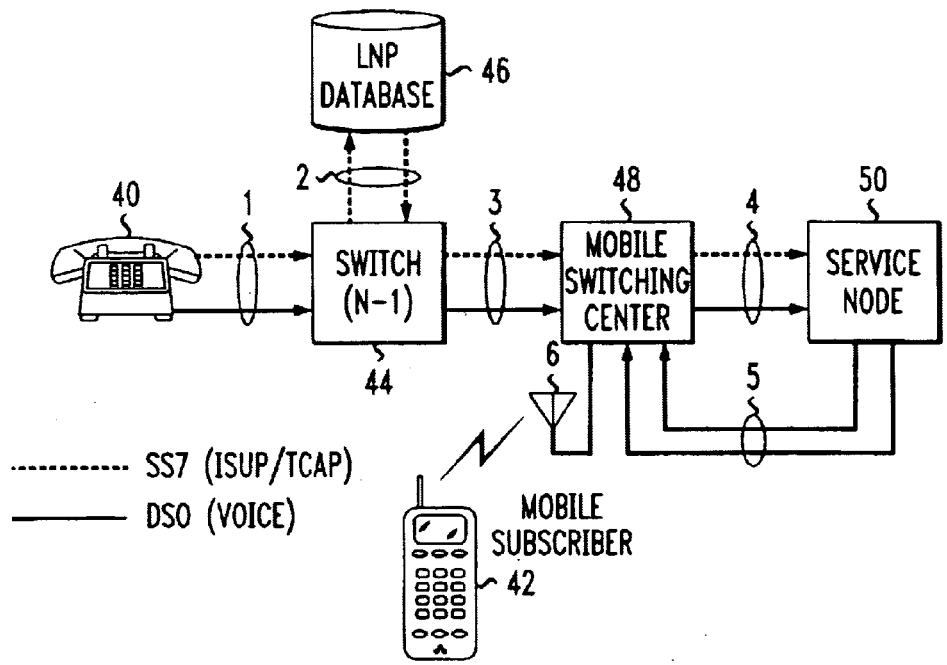
FIG. 2 is a schematic block diagram of a prior art communication network where special services are being provided.
Figure 3:
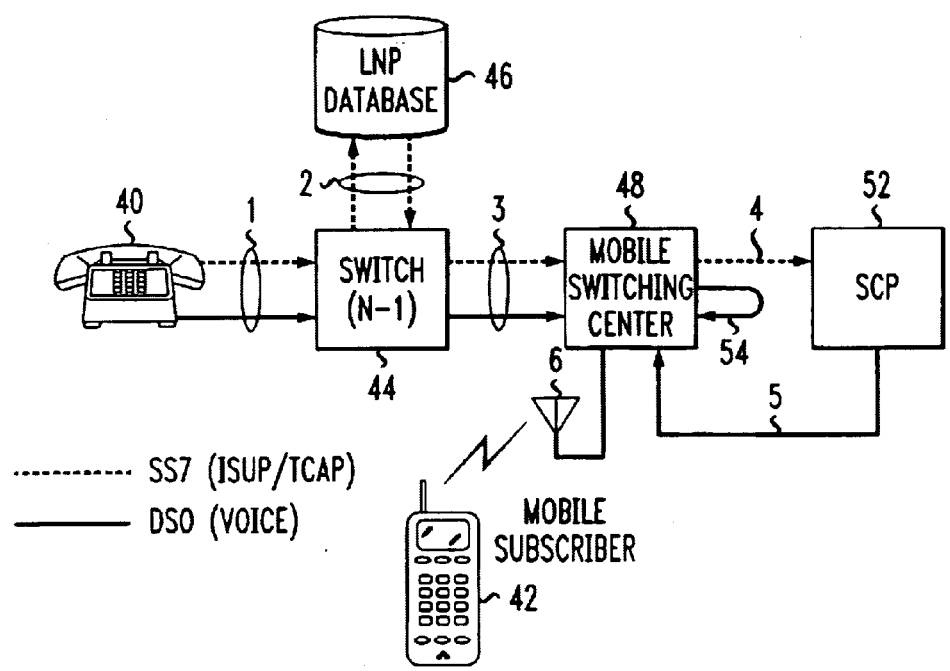
FIG. 3 is a schematic block diagram of a prior art communication network requiring a loop-around circuit for voice communications.
Figure 4:
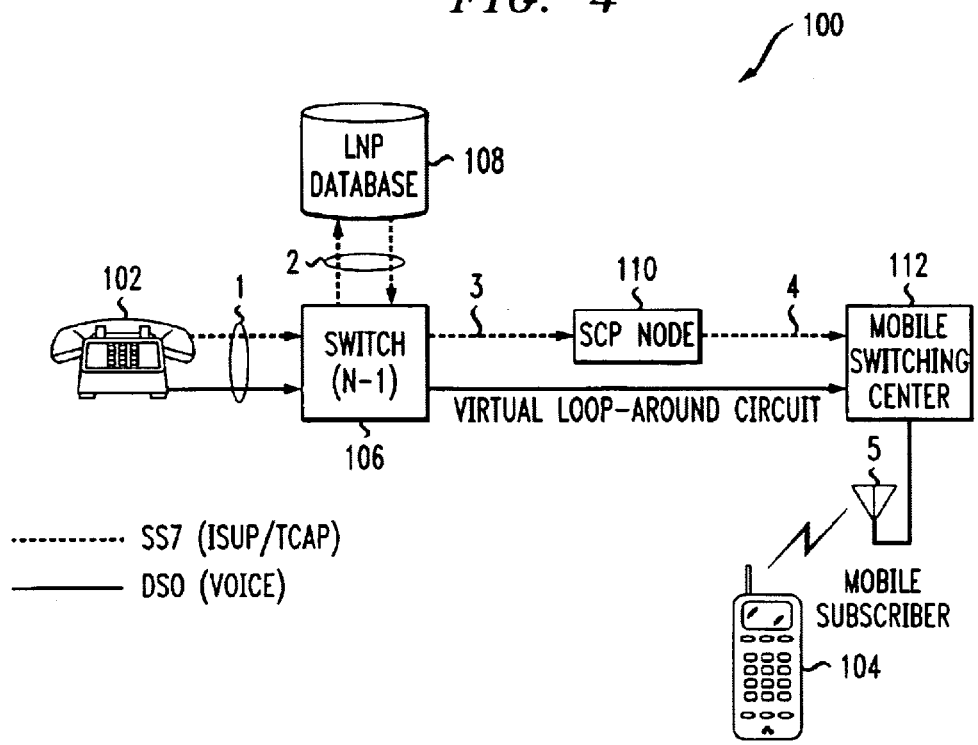
FIG. 4 is a schematic block diagram of a quasi-associated signaling communications network, including a system for establishing network signal paths.

FIG. 4 is a schematic block diagram of a quasi-associated signaling communications network, including a system 100 for establishing network signal paths. In step 1 a call is placed by telephone 102 attempting to terminate to a mobile subscriber's terminating remote communication device, or terminating telephone 104. The terminating telephone 104 has a first telephone number, or MDN in wireless applications. The terminating telephone 104 sends and receives voice communications. The call arrives at the last switch, (N-1) Switch Signal Point (SSP) 106, outside of a mobile subscriber's terminating switch. At this point in the call, no check has been made to determine if the first telephone number of the terminating telephone 104 has been ported to another carrier or to a new exchange. Alternately stated, an originating remote communication device, or originating telephone 102 is connected to an LEC (N-1) switch 106. The originating remote communication device 102 originates and dials the first telephone number of the terminating telephone 104. The (N-1) switch 106 includes mechanisms which initiate a determination of whether the first telephone number of the terminating telephone 104 is a ported number. The (N-1) switch 106 initiates out-of-band communications signals with the LNP database 108 to determine the LRN of the first telephone number.

In step 2 a determination has been made at LNP database 108 that the MDN, or first number, requires redirection. That is, the first number has been provisioned to indicate that it is a ported number. The LRN associated with the first number next directs the call to a service node 110. Specific telephone numbers are marked as ported numbers in the LNP database 108 for specific services. These ported telephone numbers direct the calls to a particular LRN. The LNP database 108 including a cross-referenced list of ported telephone numbers and LRNs. The LNP database 108 supplies the LRN instruction to the service node 110 in response to the provision of the first telephone number of the terminating telephone 104. That is, the (N-1) switch 106 initiates communication with the service node 110 in response to receiving the LRN associated with the first telephone number of the terminating telephone 104.

In step 3 the call is delivered to the SCP service node 110 using ISUP signaling. The service node 110 is connected in the signal path to the terminating telephone 104. However, the voice path is directly connected to a terminating switch 112. In a landline telephone system, terminating switch 112 is a Class-5 landline switch or SSP (not shown), and a landline connection connects the switch to landline terminating telephone 104. A Class-5 switch supports trunk calls to other switches and direct lines to telephones. As shown, terminating switch 112 is an MSC for a wireless network, and signal connections between MSC 112 and the terminating telephone involve a wireless communications link. The voice path does not pass through the SCP 110, however; the SCP 110 is connected in the out-of-band signal path to the terminating telephone 104. Voice communication signals, as used herein, mean the information content transferred between telephone users, such as DS0 signals. Typically, this "call" is a voice communication between individuals using terminating telephone 104 and originating telephone 102. However, the information content of the call can also be digital data signals, such as those used to support the modem or Internet protocol signals. The SCP 110 inserts itself into a call to process the monitoring of connect time, redirecting calls for announcements, and disconnecting calls that exceed specific thresholds. The key to the insertion is that the SSP 110 continues to receive and pass on all of the call progress SS7 ISUP messages between the switches 106 and 112, while simulating trigger events within the virtual switch 110.

The SS7 Voice trunks between the MSC 112 and the (N-1) LEC Switch 106 can be shared trunks (not dedicated for a particular service). This is accomplished in the SCP 110 by modifying the point codes in the initial address message (IAM). That is, for calls not concerning SCP 110, such as when the called or calling party is not a subscriber, the SCP 110 just performs a pass-through function (passing slightly modified LAMs to next switch) for non-subscriber voice calls.

The SCP 110 is a network element controlling the call using ISUP signaling, and the SCP 110 provides network services to the terminating telephone 104 in response to being connected in the signal path. The SSP 110 can perform special feature handling using ISUP. For example, the call can be recalled to the SCP 110 for diversion to another destination or call release. Such services include prepaid plans where the mobile subscriber of the terminating telephone 104 has a prepaid account. The SCP 110 monitors the length of the call, or any other services performed, and debits the account for the monitored services. Other services include single number service and call attendant redirection services, such as redirecting calls using a time-of-day schedule. The service node 110 monitors communications with the terminating telephone 104 to provide billing information associated with network services used by the terminating telephone 104. The SCP 110 is considered a virtual switch because the physical voice path between the (N-1) switch 106 and the MSC 112 becomes a virtual loop-around circuit.

In step 4 the ISUP portion of the call is forwarded to the MSC 112 for routing to the final destination. As mentioned above, the invention's use of the SCP 110 as a service node is equally applicable where terminating switch 112 is either an MSC or SSP. When the terminating telephone 104 is a landline telephone, an SSP 112, shown as MSC 112, is associated with the first telephone number of the terminating telephone 104, and the SCP 110 creates a trunk connection to the SSP 112 from the (N-1) switch 106. Depending on the application, the out-of-band signaling message may or may not be modified. In step 5 the call is completed, either delivered to the terminating telephone 104 or routed to another destination. When the terminating telephone 104 is a wireless telephone (as shown), the MSC 112 is connected to the terminating telephone 104 through a wireless medium. As is well known in the art, the communications between the MSC 112 and the terminating telephone 104 involve the use of traffic and control channels.

Figure 5:
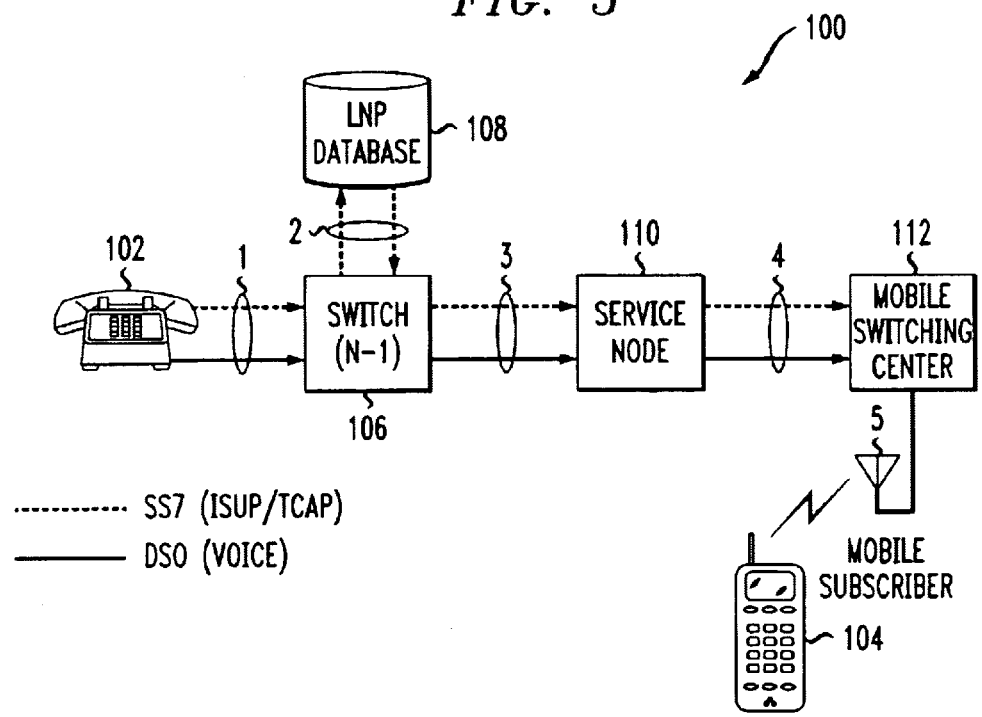
FIG. 5 is a schematic block diagram illustrating an alternate aspect of the system of FIG. 4 for establishing signal paths.

FIG. 5 is a schematic block diagram illustrating an alternate aspect of the system of FIG. 4 for establishing signal paths. In Step 1 an originating remote communication device, or originating telephone 102, is attempting to terminate a call to a mobile subscriber's terminating remote communication device, or terminating telephone 104, having a first telephone number. The call arrives at the last switch, switch (N-1) 106, outside of a mobile subscriber's serving switch. At this point in the call, no check has been made to determine if the first telephone number of the terminating telephone 104 has been ported to another carrier.

In step 2 a determination has been made at the LNP database 108 that the first number (MDN) requires redirection. That is, the first number has been provisioned to indicate that it is a ported number. Further, the LRN associated with the first number next directs the call to a service node 114.

In step 3 the call is delivered to the service node 114 for special features handling. The service node 114 is selected from the group including Intelligent Peripherals (IP)s, Service Switching Point (SSP), and combinations of IPs and SSPs, connected in the voice communication signal path to the terminating telephone 104. Examples of the services offered include prepaid service platforms and call attendant redirection services which require caller input, such as platforms and automated recordings that redirect calls for services in response to voice or dialing prompts from the telephone user.

Service node 114, while providing services for the terminating telephone 104, acts as a trunk connection, reducing the total number of legs, or switches involved in terminating the call. Because of the switches replaced using service node 114, it can be considered a virtual switch while simultaneously performing as an actual trunk connection switch. When the service node 114 is an IP, it provides network services including voice mail, voice recognition, call screening, and other services involving voice capture and announcement.

In step 4 the call is forwarded to the MSC 112 for routing to the final destination. In step 5 the call is completed to the terminating telephone 104 or routed to another destination. As above, the use of service node 114 is equally applicable when the terminating telephone 104 is a landline telephone. In this scenario the MSC 112 would be depicted as an SSP (not shown).

Figure 6:
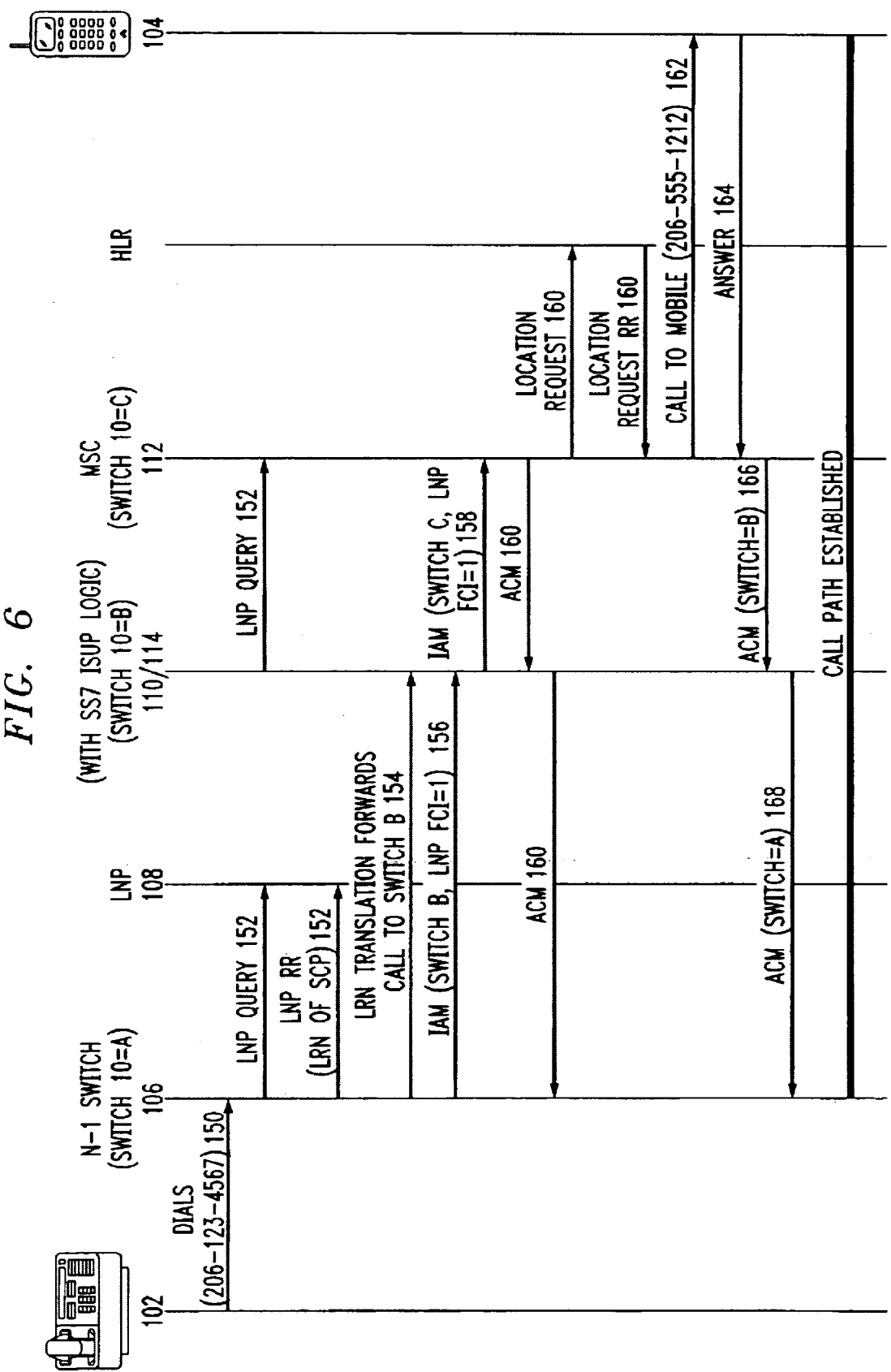
FIG. 6 is a chart presenting an alternate representation of the method for establishing a signal path using a service node, cross-referenced to FIGS. 4 and 5.

FIG. 6 is a chart presenting an alternate representation of the method for establishing a signal path using a service node, cross-referenced to FIGS. 4 and 5. Specially, FIG. 6 depicts the implementation of the present invention in a wireless environment. However, the concept is equally applicable to landline telephone networks. In step 150, a subscriber dials a ported number, such as (206-123-4567). In step 152, the N-1 Switch 106 (Switch ID=A) does a LNP Query and reports back an LRN in the Return Result.

In step 154, the N-1 Switch 106 translates the LRN into a route to the service node 110/114. In step 156, an IAM is sent to the service node 110/114 with the LRN Forward Call Indicator set to 1, indicating that an LNP dip had occurred. The service node 110/114 (Switch ID=B) receives the IAM, looks up the called party number in its database and determines if the call needs to receive Service X (i.e., Enhanced Prepaid Service or equivalent). In step 158, the service node 110/114 formulates a new IAM with its Point Code and sends the IAM to the MSC 112 (Switch ID=C). In step 160, the MSC 112 receives the IAM, acknowledges the IAM with the Address Complete (ACM) and sends a Location Request to the HLR. As the service node 110/114 receives the Address Complete (ACM) from the MSC 112, it forwards it to the originating switch 106.

In step 162, the HLR goes through normal call processing to find the mobile 104 (either at the Serving MSC or by using the Route Request processing). The HLR returns the Location Request Return Result back to the MSC 112. In step 164, the MSC 112 pages the mobile 104. Assuming the mobile 104 answers, step 166 includes the MSC 112 sending the Answer (ANM) back to the service node 110/114. In step 168, the service node 110/114 receives the ANM message and returns the Answer to the originating switch 106. A call path is established between the originator telephone 102 and the called party telephone 104.

One additional benefit of using the LNP method of the present invention for redirecting calls to the service node configured as SCP (Virtual Switch) 110 is that "ISUP Loop Around" trunks are not required for calls originating from the LEC. The LNP redirection capability allows the network to manage new services without requiring dedicated "10K" blocks of translations in the MSC. Each new service can be given a new Local Routing Number to identify the particular service.

Figure 7:
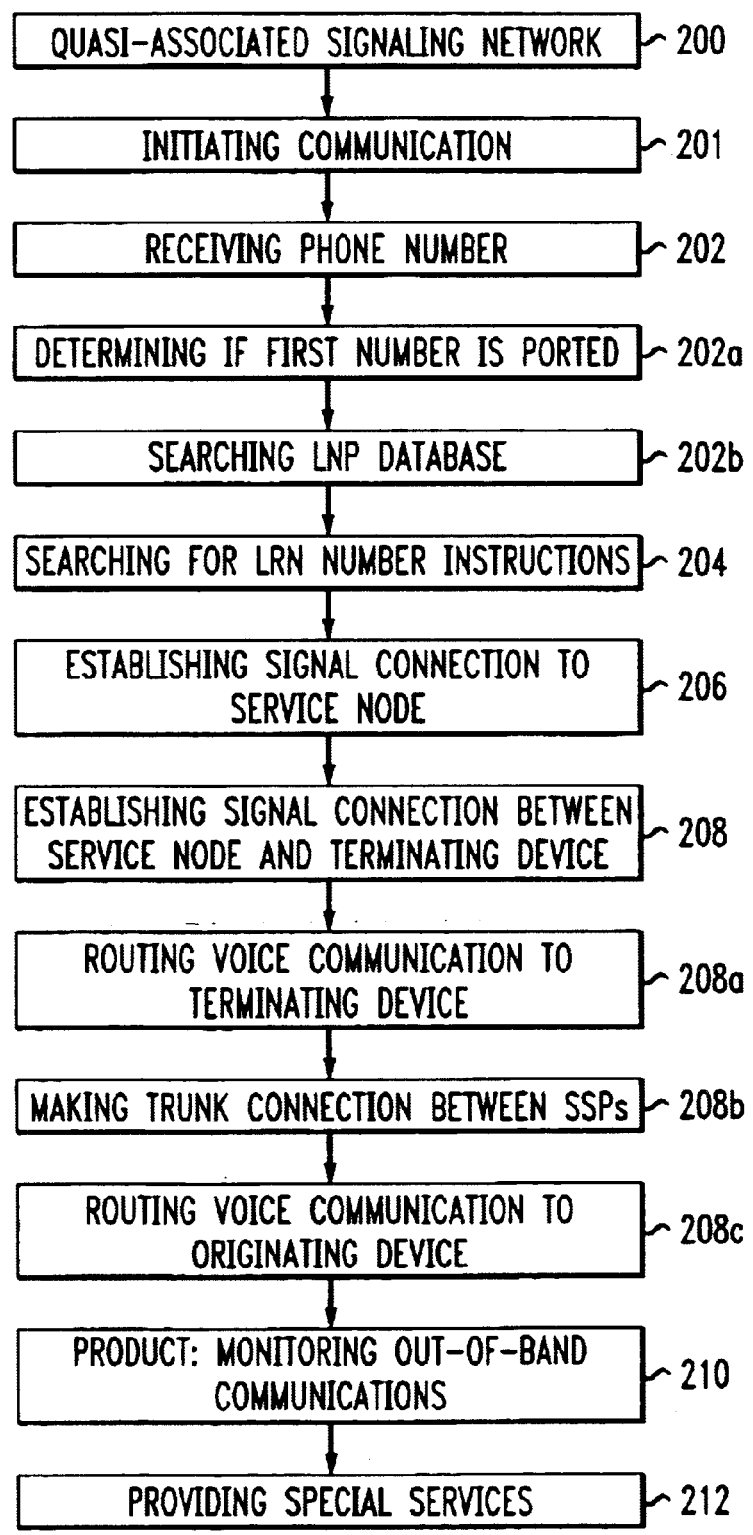
FIG. 7 is a flowchart illustrating a method for establishing network signal paths.

FIG. 7 is a flowchart illustrating a method for establishing network signal paths. Although the process is numbered for clarity in the presentation, no order should be inferred from the numbering unless explicitly stated. Step 200 begins with a quasi-associated signaling communications network. Step 202 receives a first telephone number for a terminating remote communication device, or terminating telephone. Step 204 searches for the Local Routing Number (LRN) instructions associated with the first telephone number. Step 206, following the LRN instructions, establishes a signal connection to a service node which monitors services. Step 208 establishes a signal connection between the service node and the terminating telephone. Step 210 is a product where the service node monitors signals to the terminating remote communication device.

In some aspects of the invention Step 200 includes an SCP as the service node. Then, the signal connection between the SCP and the terminating telephone in step 208 is an out-of-band signal connections, and the monitoring the signals by the service node in Step 210 includes the SCP monitoring out-of-band signals to and from the terminating telephone. The services include prepaid caller and universal number plans where the telephone user retains the same telephone number for a variety of telephone services.

Figure 8:
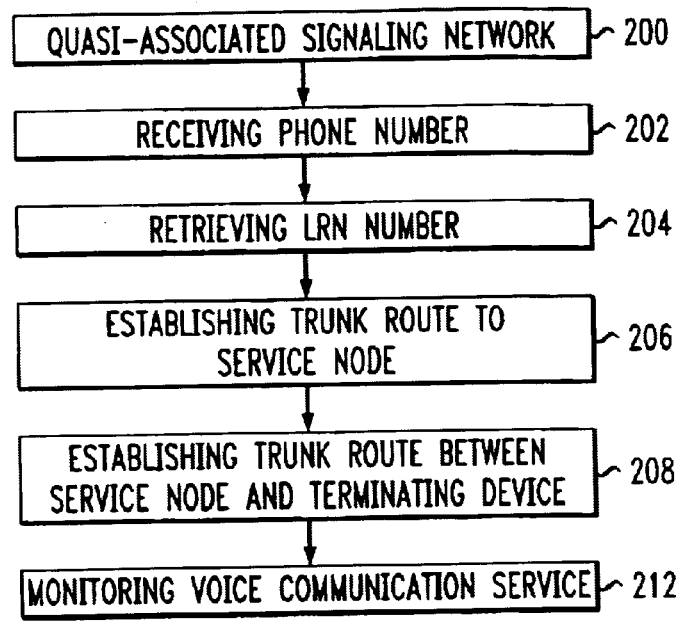
FIG. 8 is a flowchart illustrating the present invention of FIG. 7, using the service node as a trunk connection.

FIG. 8 is a flowchart illustrating the present invention of FIG. 7, using the service node as a trunk connection. That is, the establishment of a signal connections in steps 206 and 208 includes establishing a trunk route for voice communications through the service node. In this scenario, the service node is either an IP, an SSP, or a combination of the two. When the service node is an IP, step 212, uses the IP to monitor voice communication services. The voice communication services include voice mail, call screening, voice recognition, and other services involving voice capture and announcement.

Returning to FIG. 7, step 200 includes accessing an LNP database in some aspects of the invention. Then, in step 202a it is determined if the first telephone number is a ported number, and in step 202b a search is made for the first telephone number in an LNP database. Step 204 includes retrieving the LRN associated with the first telephone number from the LNP database.

In other aspects of the invention step 200 includes an originating remote communication device, or originating telephone. Then, in step 201 the originating telephone initiates voice communications with the terminating telephone. Step 202, the reception of the first telephone number, includes the originating telephone dialing the first telephone number.

In some aspects of the invention, step 200 includes accessing a terminating switch and an SSP. The establishment of a signal connection in step 208 includes sub-steps. Step 208a routes voice communications between the terminating telephone and a terminating switch associated with the terminating telephone. Step 208b makes a trunk connection between the terminating switch and an (N-1) SSP, and step 208c routes voice communications between the (N-1) SSP and the originating telephone.

In some aspects of the invention step 200 includes a wireless telephone as the terminating telephone and an MSC wireless network terminating switch. Then, the use of an LRN instructions to establish a signal connection in step 208 includes establishing voice communications between the MSC and the terminating telephone.

Figure 9:
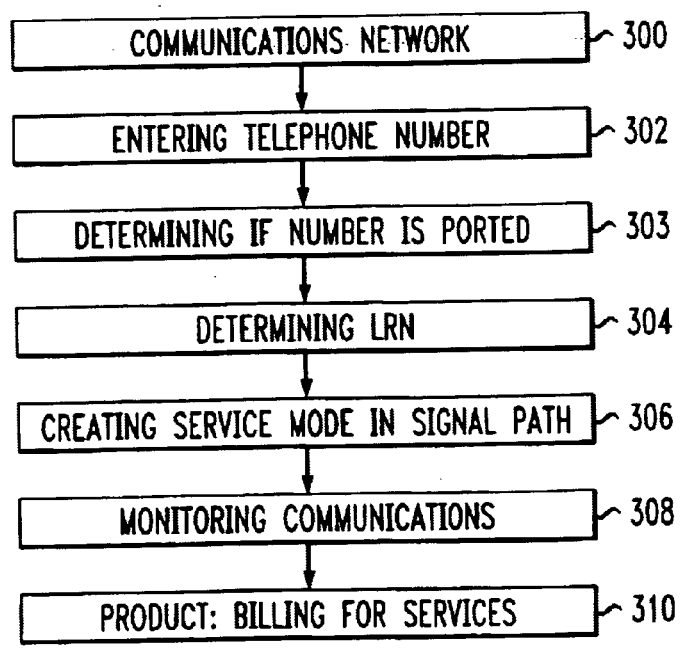
FIG. 9 is a flowchart illustrating a method for using a service node to bill communication network services to a terminating remote communication device, or terminating telephone.

FIG. 9 is a flowchart illustrating a method for using a service node to bill communication network services to a terminating remote communication device, or terminating telephone. Step 300 starts with a communications network. Step 302 enters the telephone number of the terminating telephone. Step 304 determines the Local Routing Number (LRN) associated with the telephone number. Step 306, in response to the LRN, accesses a service node in the signal path to the terminating telephone. Step 308 monitors the communications with the terminating telephone, using the service node to determine the service provided. Step 310 is a product where the terminating telephone is billed in response to the monitored services.

In some aspects of the invention, the terminating telephone is a wireless telephone. A further step, step 303, determines if the telephone number (MDN) of the wireless telephone is a ported number. Then, the LRN determination made in step 304 includes searching an LNP database of ported numbers to find the LRN.

In some aspects of the invention, the service node is an SCP. The monitoring of communications in step 308 includes monitoring out-of-band communication signals to the terminating telephone. Step 308 monitors services selected from the group including caller prepaid plans and universal number plans.

In other aspects of the invention, step 300 provides that the service node is selected from the group including of Intelligent Peripherals (IP)s, Service Switching Point (SSP), and combinations of IPs and SSPs. Then, the monitoring of communications in step 308 includes monitoring voice communications. When step 300 provides an IP service node, step 308 includes the monitored services being selected from the group including call screening, voice activation services, and voice mail.

A system and method have been provided for inserting a virtual switch into the trunk and out-of-band linkage between communicating elements in a telephone network. The virtual switch permits the network to provide special services to the called party. Further, the virtual switch operates as a convenient point to monitor communications for the purpose of service billing. The present invention uses LNP and the PSTN trunks as a virtual loop-around trunks for applications that traditionally use MSC loop-arounds, such as with pre-paid or calling party pays service. An LNP is used to redirect termination attempts to a special service platform prior to reaching the MSC. Other variations and embodiments of the invention will occur to those skilled in the art.

What is claimed is:

1. In a quasi-associated signaling communications network including a terminating remote communication device, a method of establishing a network signal path, the method comprising:

receiving a first telephone number for a terminating remote communication device;

searching for Local Routing Number (LRN) instructions, associated with the first telephone number;

using the LRN instructions, establishing a signal connection to a service node which monitors services;

establishing a signal connection between the service node and the terminating remote communication device; and using the service node, monitoring signals to the terminating remote communication device.

2. The method of claim 1 wherein the service node is a Service Control Point (SCP);

in which the signal connection between the service node and the terminating remote communication device is an out-of-band signal connection; and in which the monitoring of signals by the SCP includes monitoring out-of-band signals.

3. The method of claim 2 in which monitoring the out-of-band signals includes determining the network services provided to the terminating remote communication device.

4. The method of claim 3 in which the monitoring of services includes determining services selected from the group including prepaid caller plans and universal number plans.

5. The method of claim 1 in which the establishment of a signal connection between the service node and the terminating remote communications device includes establishing a trunk route for voice communications.

6. The method of claim 5 wherein the service node is selected from the group including Intelligent Peripherals (IP)s, Service Switching Point (SSP), and combinations of IPs and SSPs.

7. The method of claim 6 wherein the service node is an IP, the method further comprising:

establishing a signal connection through the IP to monitor voice communications services selected from the group including voice mail, call screening, voice recognition, and other services involving voice capture and announcement.

8. The method of claim 1 wherein a Local Number Portability (LNP) database is accessed, the method further comprising:

determining if the first telephone number is a ported number;

searching for the first number in an LNP database; and in which the search for the associated Local Routing Number (LRN) includes retrieving the LRN instructions from the LNP database.

9. The method as in claim 8 wherein an originating remote communication device is provided, the method further comprising:

using the originating remote communication device, initiating a voice communication with the terminating remote communication device; and in which the reception of the first telephone number includes the originating remote communication device dialing the first telephone number.

10. The method of claim 9 wherein an (N-1) Switch Signal Point (SSP) and a terminating switch are accessed, and in which establishment of the signal connection between the service node and the terminating remote communications device includes:

routing voice communication between the terminating remote communication device and a terminating switch associated with the terminating remote communication device;

trunking between the terminating switch and an (N-1) SSP; and routing the voice communications between the (N-1) SSP and the originating remote communication device.

11. The method of claim 10 wherein the terminating remote unit is a wireless telephone and the terminating switch associated with the first number is a Mobile Switching Center (MSC) for a wireless network; and in which routing of voice communications between the terminating switch and the terminating remote communication device includes establishing voice communication between the MSC and the terminating remote communication device.

12. In a quasi-associated signaling communications network, a system for establishing network signal paths comprising:

a terminating remote communication device, having a first telephone number, to send and receive voice communications;

a service node connected in the signal path to said terminating remote communication device;

a Local Number Portability (LNP) database including a cross-referenced list of ported telephone numbers and Local Routing Numbers (LRN)s, said LNP database supplying the LRN instruction to said service node in response to the provision of the first telephone number of said terminating remote communication device;

and in which said service node provides network services to said terminating remote communication device in response to being connected in the signal path.

13. The system of claim 12 in which said service node is a Service Control Point (SOP) connected in the out-of-band signal path to said terminating remote communication device.

14. The system of claim 13 in which said SCP monitors out-of-band communications to provide network services selected from the group including caller prepaid and universal number plans.

15. The system of claim 12 in which said service node is selected from the group including Intelligent Peripherals (IP)s, Service Switching Point (SSP), and combinations of IPs, and SSPs, connected in the voice communication signal path to said terminating remote communication device.

16. The system of claim 15 in which said service node is an IP to provide network services selected from the group including voice mail, voice recognition, call screening, and other services involving voice capture and announcement.

17. The system of claim 12 further comprising:
a terminating switch associated with the first telephone number of said terminating remote communication device; and
in which said service node creates a trunk connection to said terminating switch.

18. The system of claim 17 in which said terminating remote communication device is a wireless telephone;
in which said terminating switch is a Mobile Switching Center (MSC) for a wireless network, said MSC being connected to said terminating remote communication device through a wireless medium.

19. The system of claim 17 further comprising:
an (N-1) Switch Signal Point (SSP);
an originating remote communication device connected to said (N-1) SSP, said originating remote communication device originating and dialing the first number of said terminating remote communication device;
in which said (N-1) SSP includes mechanisms for initiating the determination of whether the first telephone number of said terminating communication device is a ported number; in which said (N-1) SSP initiates out-of-band communication signals with said LNP to determine the LRN of the first telephone number; and
in which said (N-1) SSP initiates communication with said service node in response to receiving the LRN.

20. The system of claim 12 in which said service node monitors communications with said terminating remote communication device to provide billing information associated with network services used by said terminating remote communication device.

21. In a communications network, a method for using a service node to bill a terminating telephone for network services, the method comprises:
entering the telephone number of the terminating telephone; determining the Local Routing Number (LRN) associated with the telephone number of the terminating telephone;
in response to the LRN, creating a service node in the signal path to the terminating telephone;
monitoring the communications with the terminating telephone using the service node to determine the service provided; and
billing the terminating telephone in response to the monitored services.

22. The method of claim 21 wherein the terminating telephone is a wireless telephone, and further comprises:
determining if the telephone number of the wireless telephone is a ported number; and
in which the LRN determination includes searching a Local Number Portability (LNP) database of ported numbers to find the LRN.

23. The method of claim 22 wherein the service node is a Service Control Point (SCP);
in which the monitoring of communications includes monitoring out-of-band communication signals to the terminating telephone; and
in which the monitored services are selected from the group including caller prepaid plans and universal number plans.

24. The method of claim 22 wherein the service node is elected from the group including Intelligent Peripherals (IP)s, Service Switching Point (SSP), or combinations of IPs and SSPs; and
in which the monitoring of communications includes monitoring voice communications.

25. The method of claim 24 in which the service node is an IP; and
in which the monitored services are selected from the group including call screening, voice activation services, and voice mail.

* * * * *